Aug. 14, 1973 J. R. HENSHILWOOD 3,752,743

BIOLOGICAL INDICATOR

Filed March 15, 1972

United States Patent Office 3,752,743
Patented Aug. 14, 1973

3,752,743
BIOLOGICAL INDICATOR
Jack R. Henshilwood, Highland, Ind., assignor to
Colab Laboratories, Inc.
Filed Mar. 15, 1972, Ser. No. 234,726
Int. Cl. C12k 1/10
U.S. Cl. 195—127                                    5 Claims

ABSTRACT OF THE DISCLOSURE

A sterilizing test device is provided for testing the completeness of sterilization procedures. The device comprises a semi-rigid transparent envelope with separate compartments for gas access, for the culture medium and for a source of micro-organisms, the compartments being interconnected so that the culture medium can be passed into contact with the micro-organisms and so that external air will be provided to the micro-organisms during their culture growth.

BRIEF SUMMARY OF THE INVENTION

This invention relates to a device for testing the effectiveness of sterilization.

It has been common heretofore to test the effectiveness, or completeness, of a sterilization process by placing within the sterilization vessel a piece of absorbent paper containing live bacteria, spores, or other micro-organisms. Such a piece of paper, known as a "spore strip," is commonly removed from the sterilization vessel upon the completion of the sterilization process, placed in a culture medium and maintained at a suitable culture temperature for a period sufficient to determine whether the micro-organisms on the spore strip are still alive. The testing of sterilization completeness in this manner is troublesome and time-consuming and sometimes gives erroneous results because of contamination of the spore strip in handling.

More recently, a sterilization test device has been made which provides a culture medium and a spore strip within a flexible bag made of a semi-permeable material, such as polyethylene, which permits passage of air and other gases therethrough but is impervious to the passage of micro-organisms. The culture medium is maintained within a breakable glass capsule in the envelope which is not broken until the envelope is removed from the sterilization vessel after the completion of the sterilization process.

Such a device provides ease in handling and provides assurance against accidental contamination, provided that the flexible film envelope remains intact. However, there is a problem in maintaining the film intact in the presence of shards of broken glass from the glass capsule.

The above-described device provides a protective, flexible sheath around the glass capsule to prevent accidental breakage and the sheath tends to limit the spread of broken glass. However, the sheath is open-ended and only partially effective in keeping glass shards from the flexible film. Furthermore, the necessity of providing such a sheath complicates the fabrication of the apparatus and adds to its cost.

Another sterilization test device utilizes a spore strip and a glass-encapsulated culture medium within a semi-rigid flexible outer tube made of polypropylene which is impervious to gas as well as to micro-organisms. The tube is capped, but gas access is provided through a hole in the cap and through a fibrous bacterial filter under the cap which is tautly stretched over the opening of the tube.

The latter device is also subject to the risk of damage to the bacterial filter by shards of glass from the broken capsule and to the added risk that the bacterial filter may become saturated with liquid culture medium, thereby impairing its gas transmissivity.

Furthermore, glass shards in this device get into the culture medium in the vicinity of the spore strip, sometimes making it difficult to see changes in the culture medium and to ascertain with confidence whether or not growth has taken place.

In accordance with the instant invention, a sterilization test device is provided in which a gas permeable membrane, a capsule containing a culture medium, and a spore strip are separately compartmented to permit the culture medium to come into contact with the spore strip but to minimize the possibility of having glass shards contact either the membrane or the spore strip and the possibility of having the culture medium contact the membrane.

Specifically, there is provided a sterilizing test device comprising a semi-rigid transparent envelope having an upper compartment, a central compartment, and a lower compartment, said upper and lower compartments being connected to said central compartment by narrow passageways, said lower and central compartments being hermetically sealed except for said narrow passageways, and said upper compartment being hermetically sealed except for said passageways and except for a semi-permeable window permitting the transmission of gas therethrough while preventing the transmission of micro-organisms therethrough, said central compartment containing a breakable capsule containing a sterile liquid culture medium, and said lower compartment containing a source of micro-organisms.

BRIEF DESCRIPTION OF THE DRAWINGS

The device of this invention is best understood from the drawings, in which.

DETAILED DESCRIPTION OF THE INVENTION

Figure 1:
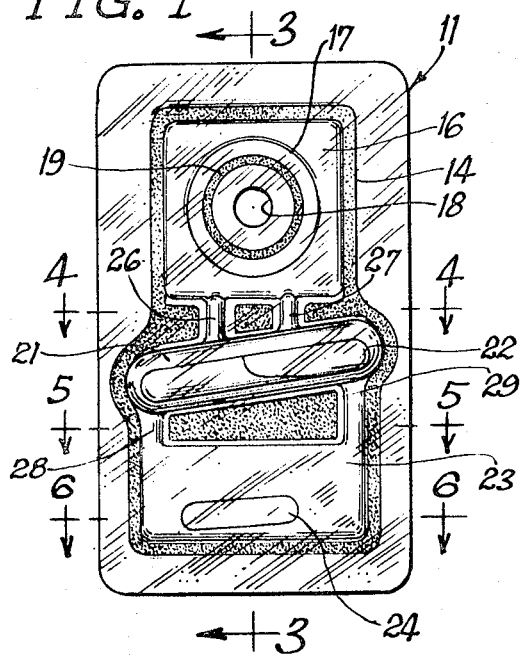
FIG. 1 is a front view of the assembled device.
Figure 2:
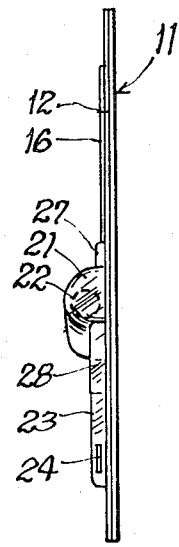
FIG. 2 is a side view of the assembled device.
Figure 3:
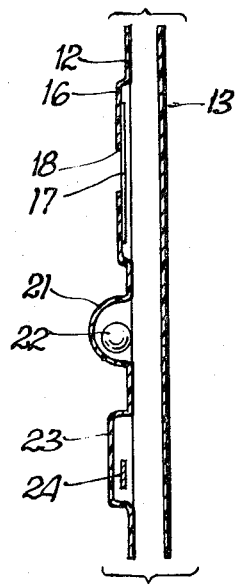
FIG. 3 is a vertical cross section taken along plane 3—3 of FIG. 1, but showing the device before the final assembly thereof.
Figure 4:
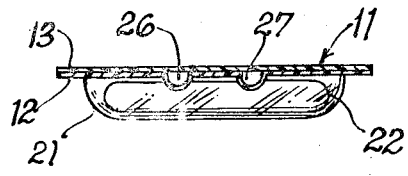
FIGS. 4, 5 and 6 are horizontal cross sections taken along planes 4—4, 5—5 and 6—6 of FIG. 1, respectively.
Figure 5:
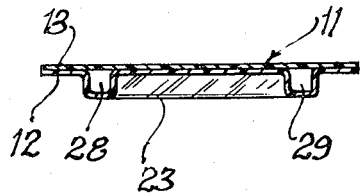
Figure 6:
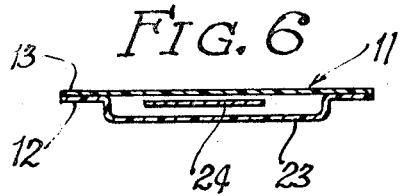

As may be seen from the drawings, envelope 11 comprises forward wall 12 and rear wall 13, sealed to each other about peripheral area 14. Both walls are made of a thermoplastic, semi-rigid, clear, transparent, inert sheet material, such as a polycarbonate sheet material having a thickness between about 10 and about 20 mils. The sheets are preferably stippled on their adjacent surfaces in area 14 to provide better heat sealing characteristics. Rear wall 13 is substantially flat. Forward wall 12 is vacuum formed to provide three separate "blisters" or compartments. Upper compartment 16 is a low profile compartment to provide separate housing for semi-permeable membrane 17 which covers opening, or window, 18 in compartment 16. Membrane 17 is preferably made of glassine, a low cost cellulosic material which can be used in the device of this invention because of the arrangement which keeps the membrane from being wetted by the culture medium, as will be described hereinafter. Membrane 17 is heat sealed to forward wall 12 about circular boundary 19.

Central compartment 21 is a blister of higher profile so that it can hold glass capsule 22 which contains a sterile, aqueous, liquid culture medium. The culture medium contains nutrients for the micro-organisms on the spore strip described below and generally also contains an indicator, such as pH indicator or an oxidation-reduction indicator, which will undergo a color change in response to the growth of the micro-organisms. In some cases, however, the indicator may be omitted and the growth of the micro-organisms may be ascertained by the increase in turbidity of the culture medium. The culture medium used in this invention may be of any one of the types well known for sterilization testing.

Lower compartment 23 accommodates spore strip 24 and accommodates the contents of capsule 22 after the capsule is broken. Spore strip 24 is made of absorbent paper and is impregnated with spores, bacteria or other micro-organisms, as is well known in sterilization testing.

Upper compartment 16 and central compartment 21 are connected by narrow passageways 26 and 27 which provide free passage of gas between the compartments, but which are narrow enough to prevent glass shards from the capsule from passing into the vicinity of semi-permeable membrane 17. If desired, a single passageway may be used to connect compartments 16 and 21.

Central compartment 21 and lower compartment 23 are connected by narrow passageways 28 and 29 which provide free passage of both gas and culture medium between the compartments but which are narrow enough to prevent glass shards from passing into the vicinity of the spore strip. Passageways 28 and 29, while narrow, are generally wider than passageways 26 and 27 because the former are intended to provide passage of a liquid which, because of its viscosity and surface tension, requires a wider passageway. The width of the passageways is dependent on the flow characteristics of the culture medium, but in general passageways 26 and 27 will have an average transverse dimension between about $\frac{1}{32}''$ and about $\frac{1}{8}''$ and passageways 28 and 29 will have an average transverse dimension between about $\frac{1}{16}''$ and about $\frac{1}{4}''$.

It is to be noted that compartment 21 is tilted with respect to the horizontal so that passageway 28 is shorter than passageway 29. This tilting favors the use of passageway 28 for the downward flow of culture medium when capsule 22 is broken and favors the use of passageway 29 for the venting of the air in compartment 23 as it fills up with culture medium.

The areas around passageways 26 and 27 and the area between passageways 28 and 29 are stippled, as shown in FIG. 1, for better heat sealing.

The device of this invention may be used to test the sufficiency of either heat sterilization or sterilization by gas exposure. In either case, it is maintained n the sterilization vessel for the full sterilization period at a location in the vessel where the lowest temperatures or minimal gas exposures are to be expected.

During heat sterilization, the spore strip in the device will be exposed to the same temperatures as the materials being sterilized at the same location in the sterilization vessel and the micro-organisms on the spore strip will be killed if the micro-organisms on the materials being sterilized are killed. During gas sterilization, the spore strip in the device will be exposed to the sterilizing gas which will pass through membrane 17 at window 18, then through compartment 16, passageways 26 and 27, compartment 21, passageways 28 and 29, and compartment 23.

Upon completion of the sterilization operation, the device is removed and capsule 22 is broken by a blow onto the exterior of compartment 21 while the device is maintained in upright position. The breaking of the capsule causes the contents thereof to pass through passageway 28 into compartment 23 and into contact with spore strip 24 while the gas or air in compartment 23 vents through passageway 29. The liquid does not enter compartment 16 and does not come into contact with membrane 17.

The device is then placed into an incubator or other constant temperature environment to permit the growth of whatever micro-organisms on the spore strip may not have been killed. After a suitable growth period, the device is examined to determine from the color of the indicator used whether or not growth has taken place. The use of a clear, transparent material, such as a polycarbonate sheet material for the envelope, coupled with the absence of glass shards in the growth area, makes changes in the culture medium readily visible.

While the invention has been described in detail with respect to a specific embodiment thereof, it will be understood by those skilled in the art that variations and modifications may be made without departing from the essential features thereof.

I claim:

1. A sterilizing test device comprising a semi-rigid transparent envelope having an upper compartment, a central compartment, and a lower compartment, said upper and lower compartments being connected to said central compartment by narrow passages, said lower and central compartments being hermetically sealed except for said narrow passages, and said upper compartment being hermetically sealed except for said passages and except for a semi-permeable window permitting the transmission of gas therethrough while preventing the transmission of micro-organisms therethrough, said central compartment containing a breakable capsule containing a sterile liquid culture medium, and said lower compartment containing a source of micro-organisms.

2. The sterilizing test device of claim 1 wherein said sterile liquid culture medium contains a pH indicator and said source of micro-organisms is a spore strip.

3. The sterilizing test device of claim 1 wherein said sterile culture medium contains an oxidation-reduction indicator and said source of said micro-organisms is a spore strip.

4. The sterilizing test device of claim 1 wherein said semi-rigid transparent envelope comprises a relatively flat rear wall and a forward wall containing blister protuberances corresponding to said upper, central, and lower compartments and said narrow passageways, said front wall and said rear wall being made of a transparent thermoplastic material and being heat-sealed to each other about the periphery of said envelope.

5. A sterilizing test device comprising a semi-rigid transparent envelope comprising a rear wall and a forward wall, said forward wall comprising three blister protuberances, said rear and forward walls being sealed to each other peripherally and between said protuberances to provide three interconnected compartments, including an upper compartment, a central compartment and a lower compartment, at least one narrow passageway between said upper compartment and said central compartment and at least two narrow passageways between said central compartment and said lower compartment, said upper compartment comprising an aperture in at least one of said walls covered with a semi-permeable membrane, said central compartment comprising a breakable capsule containing a sterile, aqueous, liquid culture medium, said lower compartment comprising a spore strip, and said central cavity extending substantially across the width of said envelope in a direction oblique to the horizontal midline thereof.

References Cited
UNITED STATES PATENTS 3,661,717   5/1972   Nelson ---------- 195—103.5 R A. LOUIS MONACELL, Primary Examiner
R. J. WARDEN, Assistant Examiner U.S. Cl. X.R.

195—103.5 R